United States Patent
Fujii et al.

(10) Patent No.: US 11,573,243 B2
(45) Date of Patent: Feb. 7, 2023

(54) TEMPERATURE CONTROL SYSTEM

(71) Applicant: OTSUKA PHARMACEUTICAL CO., LTD., Tokyo (JP)

(72) Inventors: Hiromi Fujii, Kyoto (JP); Teiji Tanaka, Kyoto (JP); Tatsuya Yamazaki, Kyoto (JP); Tomoharu Nakagawa, Kyoto (JP); Tetsuya Noda, Hino (JP); Atsuo Iwashita, Machida (JP); Yuuya Shouji, Hachioji (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 309 days.

(21) Appl. No.: 16/491,373

(22) PCT Filed: Mar. 2, 2018

(86) PCT No.: PCT/JP2018/007994
§ 371 (c)(1),
(2) Date: Sep. 5, 2019

(87) PCT Pub. No.: WO2018/163990
PCT Pub. Date: Sep. 13, 2018

(65) Prior Publication Data
US 2020/0018775 A1    Jan. 16, 2020

(30) Foreign Application Priority Data
Mar. 6, 2017   (JP) .............. JP2017-041368

(51) Int. Cl.
*G01N 35/10* (2006.01)
*G01N 35/00* (2006.01)

(52) U.S. Cl.
CPC ... *G01N 35/10* (2013.01); *G01N 2035/00425* (2013.01)

(58) Field of Classification Search
None
See application file for complete search history.

(56) References Cited

U.S. PATENT DOCUMENTS

| 2006/0154270 A1* | 7/2006 | Tajima | G01N 35/10 435/6.14 |
| 2010/0163111 A1* | 7/2010 | Tajima | B01L 7/52 137/339 |

(Continued)

FOREIGN PATENT DOCUMENTS

| EP | 1596200 A1 | 11/2005 |
| EP | 2145949 A1 | 1/2010 |

(Continued)

OTHER PUBLICATIONS

Machine-generated English translation of JP 6077075 (year:2017).*

(Continued)

*Primary Examiner* — P. Kathryn Wright
(74) *Attorney, Agent, or Firm* — Sughrue Mion, PLLC

(57) ABSTRACT

Provided is a temperature control system applied to an apparatus for analyzing a sample using a pipette nozzle and a reaction container, including a pipette tip temperature controller that heats a pipette tip which is fitted on the pipette nozzle and aspirates or discharges liquid and a reaction container temperature controller that heats the reaction container. The pipette tip temperature controller heats, in a concentrated manner, at least a distal end portion of the pipette tip of the pipette nozzle located at a predetermined heating position with hot air emitted from a heat source and is configured such that a distal end is capable of arriving at the reaction container by lowering the pipette nozzle from the heating position.

4 Claims, 13 Drawing Sheets

(56) References Cited

U.S. PATENT DOCUMENTS

2011/0151482 A1* 6/2011 Emery .................... G01N 1/30
   435/7.9
2012/0252132 A1* 10/2012 Tajima ............... G01N 30/6047
   436/172

FOREIGN PATENT DOCUMENTS

| JP | H4-243548 A | | 8/1992 |
| JP | 07209306 | * | 8/1995 |
| JP | 2004-061173 A | | 2/2004 |
| JP | 2009058288 A | | 3/2009 |
| JP | 4437215 B2 | | 3/2010 |
| JP | 2010-286243 A | | 12/2010 |
| JP | 6077075 B2 | * | 2/2017 |
| WO | 2014/035804 A1 | | 3/2014 |

OTHER PUBLICATIONS

Machine-generated English translation of JP 0770209306 (year:1995).*
International Search Report corresponding to Application No. PCT/JP2018/007994; dated May 1, 2018.
EPO Extended Search Report corresponding to EP Application No. 18763708.7; dated Feb. 26, 2020.
International Preliminary Report on Patentability corresponding to Application No. PCT/JP2018/007994; dated Sep. 10, 2019.

* cited by examiner

TEMPERATURE CONTROL SYSTEM

CROSS REFERENCE TO RELATED APPLICATIONS

This is the U.S. national stage of application No. PCT/JP2018/007994, filed on Mar. 2, 2018. Priority under 35 U.S.C. § 119(a) and 35 U.S.C. § 365(b) is claimed from Japanese Application No. 2017-041368, filed Mar. 6, 2017; the disclosures of which are incorporated herein by reference.

TECHNICAL FIELD

The present invention relates to a temperature control system applied to an apparatus for performing appropriate analysis processing using a pipette tip and a reaction container.

BACKGROUND ART

An analysis apparatus which analyzes a sample using a pipette tip and a reaction container is required to control both a liquid, such as a reagent or an analyte, which is aspirated, discharged, or agitated and the reaction container to a predetermined temperature (e.g., 35 to 37° C.), in terms of enhancing the accuracy of a detection result from the analysis apparatus and stabilizing reaction efficiency.

For example, Patent Literature 1 discloses a technique for retaining, on a stage formed of a heating block, a cartridge having a plurality of holding tanks which can individually hold a reagent, a diluent, a cleaning solution, or a buffer solution for reaction with a sample (analyte), such as an antibody, and a reaction tank for reaction of the analyte with an appropriate liquid (reaction liquid), controlling the temperature of and a heating time period for the heating block, and elevating the temperature of the reagent or the like in the cartridge to a target temperature (reaction temperature). The reaction tank is also temperature-controlled by the heating block.

Patent Literature 2 discloses a method for heating a pipette tip in a state of being inserted in a box-shaped heating apparatus which has a heater and a fan arranged inside and a pipette tip insertion hole formed in an upper surface and heating liquid in the pipette tip. More specifically, Patent Literature 2 discloses the aspect below. A temperature inside the heating apparatus is kept almost constant by the process of putting the heater and the fan into action with the pipette tip inserted in the heating apparatus through the insertion hole and circulating heated air inside the heating apparatus, and the pipette tip is heated via heated air. Liquid is subjected to heating processing using the pipette tip as a heat source by aspirating the liquid after the heated pipette tip is fitted onto a distal end of a pipette nozzle. Patent Literature 2 also discloses an aspect, in which the pipette tip is inserted into the heating apparatus through the insertion hole in a state where the pipette tip is fitted onto the distal end of the pipette nozzle, and liquid is aspirated in advance, and the liquid in the pipette tip is subjected to heating processing via heated air and the pipette tip.

CITATION LIST

Patent Literature

Patent Literature 1: JP 4437215 B
Patent Literature 2: JP 2009-058288 A

SUMMARY OF INVENTION

Technical Problem

According to the invention described in Patent Literature 1, although the temperature of liquid (a reagent or the like) held in each holding tank of the cartridge can be elevated to the target temperature, the temperature-elevated liquid is affected by the temperature of a pipette tip after a time when the liquid is aspirated through a distal end of the pipette tip into the pipette tip. Thus, the larger a difference between the temperature of the pipette tip itself and the liquid to be temperature-elevated is, the higher the degree of drop in the temperature of the reagent or the like that is the liquid is, and the more difficult reaction of the reagent or the like with the analyte at the targeted reaction temperature is. This may decrease analysis accuracy.

According to the invention described in Patent Literature 2, although liquid in the pipette tip can be subjected to heating processing via air and the pipette tip heated inside the box-shaped heating apparatus, a reaction container cannot be heated. At the time of injecting the liquid in the pipette tip subjected to the heating processing into the reaction container, the injected liquid is affected by the temperature of the reaction container. Thus, the larger a difference between the temperature of the reaction container and the liquid subjected to the heating processing is, the higher the degree of drop in the temperature of the liquid is, and the more difficult reaction of the reagent or the like with an analyte at a target reaction temperature is. This may decrease analysis accuracy.

Under the above-described circumstances, it is conceivable that an aspect, which is a combination of the technique described in Patent Literature 1 and the technique described in Patent Literature 2 and heats both a pipette tip and a stage which retains a cartridge having holding tanks formed therein, can solve problems with the configurations described in the above literatures.

In the case of the above-described aspect, however, if the pipette tip heated in a state of being inserted in a box-shaped heating apparatus is pulled out from the heating apparatus, the temperature of the pipette tip is affected by a working environmental temperature and decreases gradually after a time of the pull-out. Since the configuration described in Cited Literature 2 needs to move the pipette tip upward at the time of pulling out the pipette tip from a heating apparatus, as shown in FIG. 3 of Cited Literature 2, and further needs to lower the pipette tip to a position where the process of dispensing liquid to the reaction container is possible after horizontally moving the pipette tip to a position where the pipette tip does not overlap with the heating apparatus in plan view, it is impossible to perform the liquid dispensation processing immediately after pulling out the pipette tip from the heating apparatus. As a result, the temperature of liquid (a sample) in the pipette tip directly or indirectly subjected to heating processing by the heating apparatus decreases before a time when the liquid is injected into the predetermined reaction container.

Assume a case where liquid dispensation processing, agitation processing, or the like is performed a plurality of times with one pipette tip pulled out from the box-shaped heating apparatus in a state of being heated in the heating apparatus in the conceived aspect. With an increase in the number of times of processing, the degree of decrease in the temperature of the pipette tip increases under effects of the working environmental temperature, unless the pipette tip is returned into the heating apparatus. Liquid in the pipette tip is also affected by the temperature of the pipette tip. Even if the stage is heated, and the temperature of the reaction container is set to the target reaction temperature, reaction of a reagent or the like with an analyte at the target reaction temperature is difficult. This may decrease analysis accuracy.

Note that Cited Literature 2 discloses an aspect which has a heater provided inside a portion of a pipette nozzle, onto which a pipette tip is to be fitted, and heats the pipette tip with the heater. The aspect, however, lacks general versatility because the aspect needs a dedicated pipette nozzle with a built-in heater and cannot use an already-known pipette nozzle heavily used in analysis sites (a common pipette nozzle without a built-in heater) without change.

The present invention has been made with a focus on the above-described points, and has as its main object to provide a temperature control system (a temperature control apparatus) which is capable of heating a liquid, such as a reagent or an analyte, aspirated or discharged by a pipette tip and a reaction container to a temperature suitable for reaction, prevents a situation where a temperature of the liquid, such as a reagent, aspirated through or discharged from a distal end of the pipette tip from decreasing in the pipette tip before a time when liquid dispensation processing through the distal end of the pipette tip is performed, and is insusceptible to a working environmental temperature at the time of the liquid dispensation processing, agitation processing, or liquid sending processing to be performed through the distal end of the pipette tip.

Solution to Problem

That is, the present invention relates to a temperature control system applied to an analysis apparatus for analyzing a sample using a pipette nozzle and a reaction container. The temperature control system according to the present invention includes a pipette tip temperature controller that heats a pipette tip which is fitted on the pipette nozzle and aspirates or discharges liquid and a reaction container temperature controller that heats the reaction container. As the pipette tip temperature controller, one which heats, in a concentrated manner, at least a distal end portion of the pipette tip of the pipette nozzle located at a predetermined heating position with hot air emitted from a heat source is used. The pipette tip temperature controller is configured such that a distal end of the pipette tip is capable of arriving at the reaction container by lowering the pipette nozzle from the heating position.

The temperature control system according to the present invention can heat at least the distal end portion of the pipette tip to close to a targeted temperature by heating, in a concentrated (intensive) manner, at least the distal end portion of the pipette tip with the hot air emitted from the heat source while the pipette nozzle is located at the heating position. Thus, in the temperature control system according to the present invention, when a liquid, such as a reagent, is aspirated through the distal end of the pipette tip, the liquid, such as a reagent, aspirated into the heated pipette tip is also heated. Additionally, according to the present invention, when the pipette nozzle is lowered from the heating position, the pipette nozzle is affected by a working environmental temperature after a time of the lowering. However, the pipette tip and the liquid in the pipette tip can be heated with the hot air by moving the pipette nozzle to the heating position again.

The temperature control system according to the present invention can discharge a liquid, such as a reagent, heated in the pipette tip from the distal end of the pipette tip capable of arriving at the reaction container to the reaction container heated by the reaction container temperature controller while the pipette nozzle is lowered straight down from the heating position and can achieve stabilization of reaction efficiency in the reaction container. That is, the temperature control system according to the present invention can keep both a liquid, such as a reagent or an analyte, discharged to the reaction container by the pipette tip and the reaction container at temperatures close to a targeted reaction temperature, enhance the accuracy of a detection result from the analysis apparatus, and stabilize the reaction efficiency. Note that the expression "arrival of the distal end of the pipette tip at the reaction container" in the present invention only needs arrival of the distal end of the pipette tip at a part of the reaction container and is a concept which subsumes a state where the distal end of the pipette tip has arrived at a position not in contact with and close to a bottom surface of the reaction container and a state where the distal end of the pipette tip has arrived at a position in contact with a surface (liquid surface) of liquid in the reaction container if the liquid is held in the reaction container.

In the present invention, the predetermined heating position is a position appropriately selected and set and is not particularly limited. If the predetermined heating position is set at an origin position, at least the distal end portion of the pipette tip is heated in a concentrated (intensive) manner by the pipette tip temperature controller while the pipette nozzle is located at the origin position. The configuration can achieve simplification of operation control of the pipette nozzle required to heat the pipette tip with the pipette tip temperature controller, as compared with a configuration where the heating position for the pipette nozzle is set at a dedicated position different from the origin position.

As described above, adoption of the temperature control system according to the present invention allows prevention and inhibition of a situation where the temperature of liquid in the pipette tip heated by the pipette tip temperature controller is affected by an environmental temperature and decreases significantly before a time when the liquid is injected into the reaction container, as a result of performing liquid dispensation processing, agitation processing, or liquid sending processing to be performed for the reaction container through the distal end of the pipette tip while the pipette nozzle heated by the pipette tip temperature controller is lowered from the heating position.

Thus, even if the number of times liquid dispensation processing, agitation processing, or liquid sending processing using one pipette tip through a distal end thereof is performed is large, the temperature control system for the analysis apparatus according to the present invention returns the pipette nozzle to the heating position each time processing ends. This allows heating of the pipette tip and liquid in the pipette tip and avoidance of a situation where the liquid in the pipette tip decreased under effects of the working environmental temperature is dispensed, agitated, or sent. Since the above-described points are combined with the heating of the reaction container by the reaction container temperature controller, a reagent or the like and an analyte can be made to react at the target reaction temperature, and analysis accuracy is enhanced.

Additionally, the temperature control system according to the present invention does not use a dedicated pipette nozzle provided with a heating function and can use an already-known pipette nozzle heavily used in analysis sites without change, and is also excellent in general versatility and utility.

In the present invention, one which heats an internal space of a housing capable of holding at least the distal end portion of the pipette tip with the hot air emitted from the heat source and has, in a part of the housing, an opening that allows upward and downward movement of the pipette tip can be used as the pipette tip temperature controller that heats, in a concentrated (intensive) manner, at least the distal end portion of the pipette tip of the pipette nozzle located at the predetermined heating position. In this case, since at least the distal end portion of the pipette tip is held inside the housing of the pipette tip temperature controller while the pipette nozzle is located at the heating position, the distal end portion of the pipette tip can be heated to close to the targeted temperature with hot air in the housing. If the pipette tip is configured such that at least the distal end of the pipette tip is located outside the housing through the opening when the pipette nozzle is lowered from the heating position, the configuration does not interfere with access of the pipette tip to the reaction container.

The shape and size of the above-described opening are not particularly limited as long as the opening satisfies a condition allowing upward and downward movement of the pipette tip. Note that the upward and downward movement of the pipette tip accompanies upward and downward movement of the pipette nozzle. An insertion hole, which the pipette tip is insertable into (insertable/removable into/from), can be named as an example of the opening which enhances heating efficiency in the housing.

In particular, the temperature control system for the analysis apparatus according to the present invention can be configured such that the reaction container is exposed to hot air emitted from the pipette tip temperature controller, by arranging the reaction container near the pipette tip temperature controller. With the above-described configuration, an atmospheric temperature around the reaction container can be kept nearly equal to a temperature of the hot air with the hot air emitted from the pipette tip temperature controller. As a result, even in a state where the pipette nozzle is lowered from the heating position, the pipette tip is arranged under an atmosphere heated with the hot air and is insusceptible to the working environmental temperature, which is preferable.

Advantageous Effects of Invention

According to the present invention, it is possible to provide a temperature control system (temperature control apparatus) for an analysis apparatus which is capable of heating a pipette tip and liquid in the pipette tip with a pipette tip temperature controller by locating a pipette nozzle at a heating position, prevents a situation where the liquid in the pipette tip is affected by an environmental temperature and decreases at the time of processing as a result of lowering the pipette nozzle from the heating position and performing liquid dispensation processing, agitation processing, or liquid sending processing through a distal end of the pipette tip, and is capable of achieving stabilization of reaction efficiency in a reaction container by discharging the liquid in the pipette tip to the reaction container heated by a reaction container temperature controller.

DESCRIPTION OF EMBODIMENT

An embodiment of the present invention will be described below with reference to the drawings.

Figure 1:
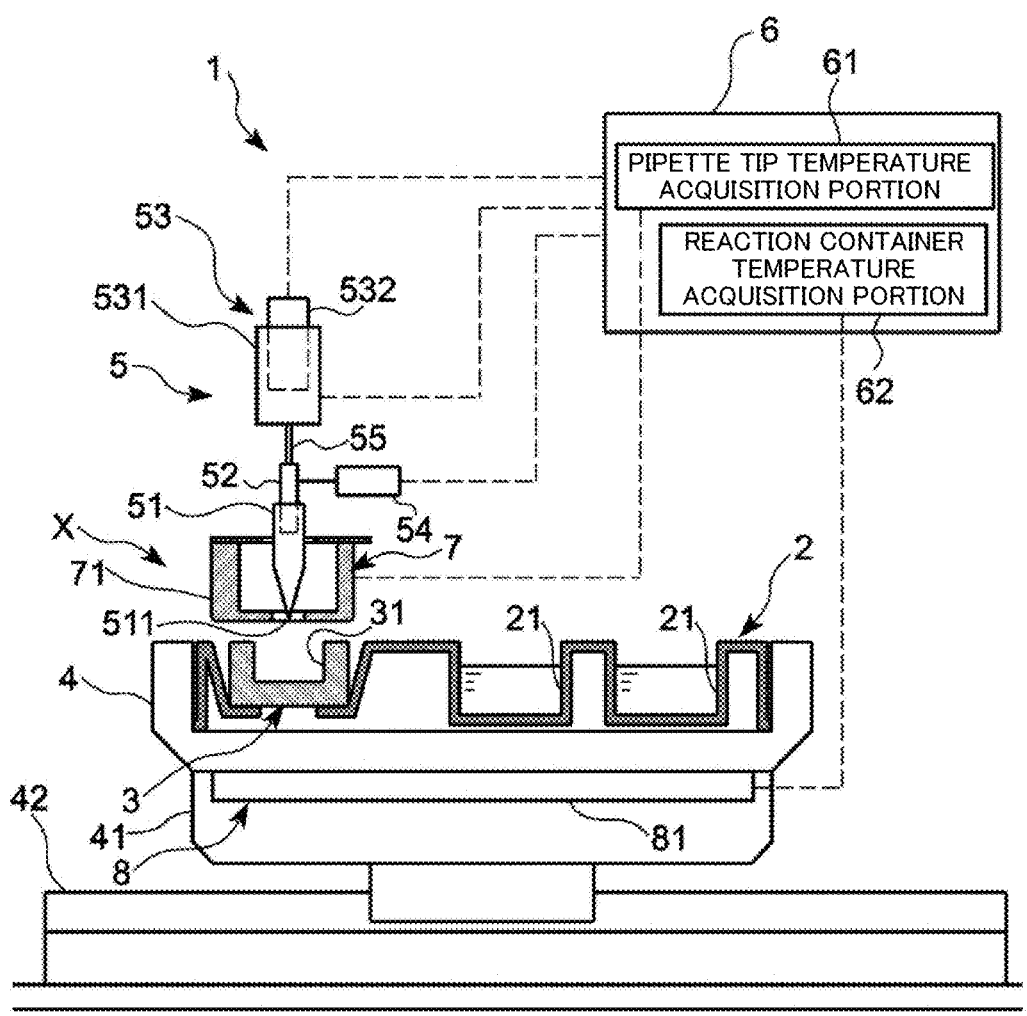
FIG. 1 is a view schematically showing a configuration of a main portion of an analysis apparatus, to which a temperature control system according to an embodiment of the present invention is applied.

A temperature control system X according to the present embodiment is, for example, one which is applied to an analysis apparatus 1 shown in FIG. 1. The analysis apparatus 1 is an apparatus which analyzes a sample (analyte) using a container (hereinafter referred to as a test cartridge 2) in which a reagent or the like and the analyte are held, a reaction container 3 for reaction of the reagent or the like with the analyte, and a pipette tip 51 which is used to aspirate, discharge, or agitate the reagent or the like and the analyte in the test cartridge 2.

The test cartridge 2 according to the present embodiment is a container in which a labelled antibody and a necessary reagent, such as a cleaning solution, are individually prepackaged in holding tanks 21. The test cartridge 2 is provided to lie across a stage 4 (see FIG. 2) of the analysis apparatus 1 in a state where the analyte including a substance to be detected is dispensed in advance to the predetermined holding tank 21. Examples of the analyte include blood, blood serum, blood plasma, urine, nasal fluid, saliva, and sperm. Examples of the substance to be detected that can be named include nucleic acids (e.g., DNA and RNA), proteins (e.g., polypeptides and oligopeptides), amino acids, carbohydrate, lipid, and modified molecules thereof.

Figure 2:
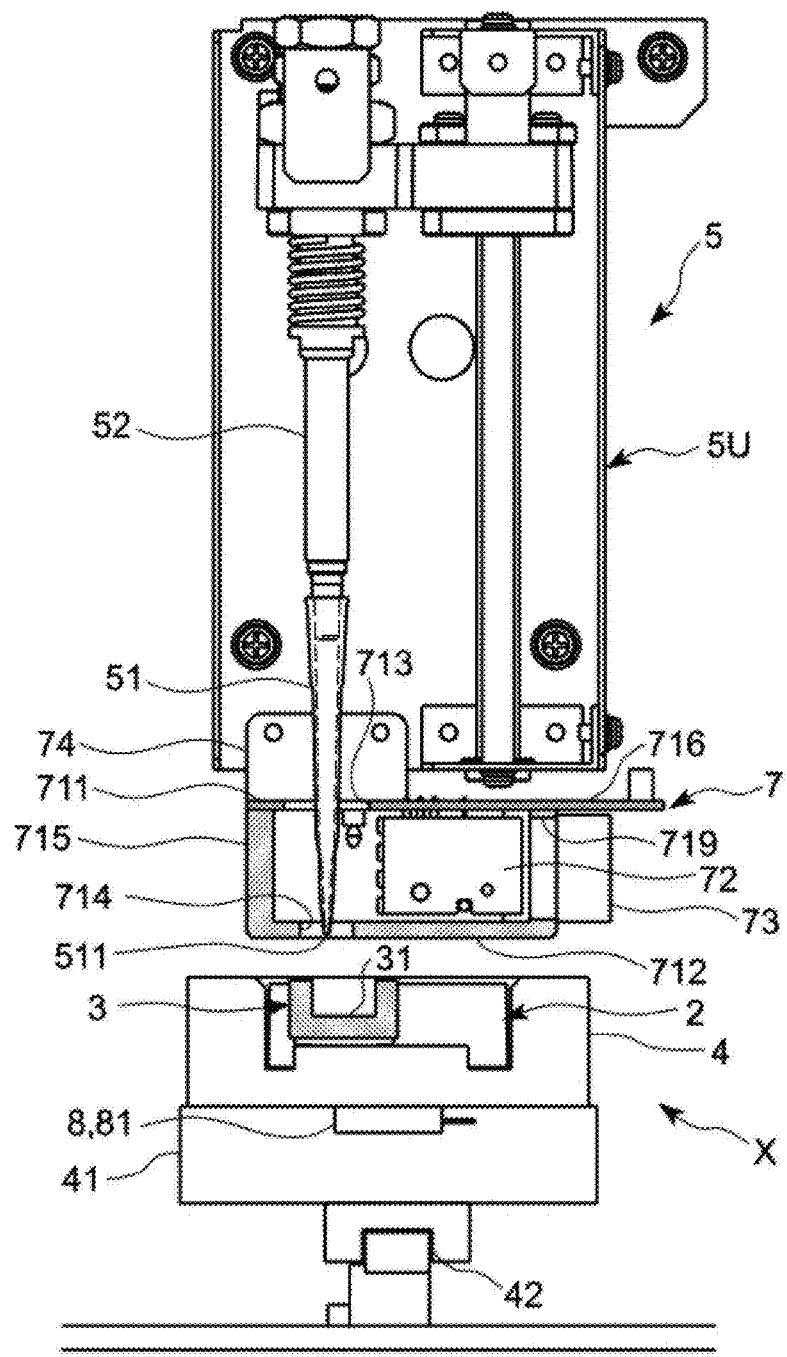
FIG. 2 is a view showing the temperature control system according to the embodiment and a relative position relationship among peripheral parts thereof.

The test cartridge 2 and the reaction container 3 schematically shown in FIG. 1 are provided to lie across the common stage 4. In the present embodiment, the reaction container 3 is mounted on the test cartridge 2, and the test cartridge 2 in this state is set on the stage 4. As shown in FIG. 1 and FIG. 2, the stage 4 is fixed on, for example, a slide base 41. When the slide base 41 is horizontally moved along a linear guide portion 42 by a stage driving portion (not shown), the stage 4 moves horizontally while retaining the test cartridge 2.

The reaction container 3 has a holding portion 31 which can hold liquid, and liquid is injected into or removed from the holding portion 31 through a distal end 511 of the pipette tip 51 inserted through an upper opening of the holding portion 31.

The analyte containing a substance as an object to be analyzed and the reagent or the like (a reaction agent) containing a substance which has an antigen-antibody reaction to the substance as the object to be analyzed are dispensed to the holding portion 31 of the reaction container 3. After the dispensation processing, information on the presence/absence and the degree of aggregation, color formation, fluorescence, and the like produced as a result of a reaction in the reaction container 3 can be acquired by appropriate means, and the composition of the analyte can be analyzed using the acquired data.

The analysis apparatus 1 includes at least a liquid sending portion 5 which aspirates and discharges liquid into and from the holding portion 31 of the reaction container 3 and a controller 6 which controls operation of the liquid sending portion 5, as shown in FIG. 1. The liquid sending portion 5 has a pipette nozzle 52 having a distal end, on which the pipette tip 51 is fitted, a pump 53 which is connected to the pipette nozzle 52, and a nozzle driving portion 54 which moves the pipette nozzle 52 upward and downward. Note that portions other than the stage 4, the liquid sending portion 5, and the controller 6 which the analysis apparatus 1 includes are not shown in FIG. 1.

The pump 53 includes a syringe 531 and a plunger 532 which is reciprocable inside the syringe 531, and a driving portion for the pump 53 (not shown) including a drive motor (e.g., a stepping motor) reciprocates the plunger 532. By reciprocating the plunger 532 while the plunger pump 53 is connected to the pipette nozzle 52 via, for example, piping 55, the process of aspirating external liquid into the pipette tip 51 or discharging the liquid in the pipette tip 51 to the outside can be quantitatively performed. Additionally, repetition of the reciprocation of the plunger 532 with respect to the syringe 531 in a state where the distal end 511 of the pipette tip 51 is brought close to a bottom surface of the holding portion 31 in the reaction container 3 agitates liquid in the holding portion 31 and achieves equalization of the concentration of the liquid, promotion of reaction, and the like. Driving of the pump 53 with a stepping motor allows management of the amount of liquid sent and the liquid sending speed of the pipette tip 51 and also allows management of the amount of liquid left in the holding portion 31 of the reaction container 3.

The nozzle driving portion 54 freely moves the pipette nozzle 52 in an axial direction (a vertical direction in the present embodiment) with, for example, a solenoid actuator or a stepping motor.

With the above-described liquid sending portion 5 including the pipette nozzle 52, the pump 53, and the nozzle driving portion 54, it is possible to discharge an analyte and inject the analyte into the holding portion 31 of the reaction container 3, and aspirate and remove liquid from inside the holding portion 31. In the present embodiment, the portions constituting the liquid sending portion 5 are made into a single unit, and the unit is configured to be treated as a sampler unit 5U, as shown in FIG. 2. Note that the pump 53 and the like are not shown in FIG. 2.

The temperature control system X according to the present embodiment includes a pipette tip temperature controller 7 which heats the pipette tip 51 and a reaction container temperature controller 8 which heats the reaction container 3, as shown in FIG. 1 and FIG. 2.

The reaction container temperature controller 8 is constructed using a heater 81 for stage temperature control which heats the stage 4. Heating of the stage 4 with the heater 81 for stage temperature control allows heating of the reaction container 3 arranged on the stage 4. The present embodiment is configured such that the temperature of the stage 4 heated by the heater 81 for stage temperature control can be sensed by an appropriate sensor.

Figure 3:
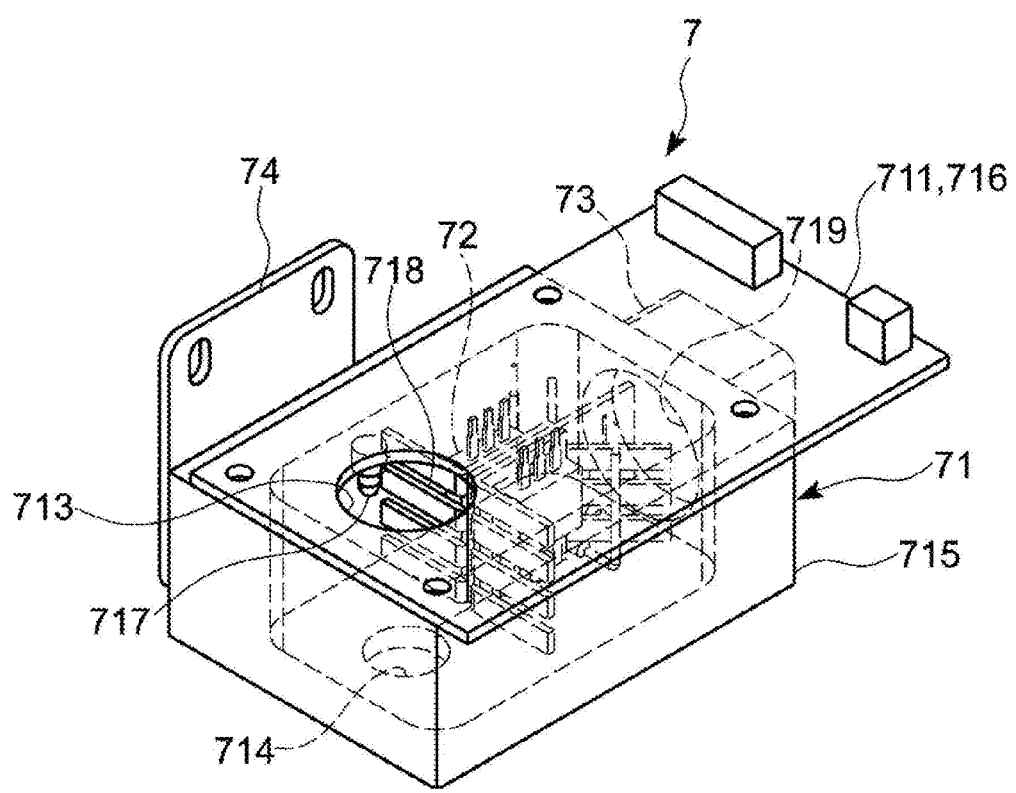
FIG. 3 is a perspective view of the whole of a pipette tip temperature controller according to the embodiment.

The pipette tip temperature controller 7 heats, in a concentrated (intensive) manner, at least a distal end portion of the pipette tip 51 of the pipette nozzle 52 located at a predetermined heating potion with hot air emitted from a heat source 72. As shown in FIG. 1 to FIG. 3, the pipette tip temperature controller 7 according to the present embodiment includes a housing 71 which can hold at least the distal end portion of the pipette tip 51, the heat source 72 that is arranged inside the housing 71, and a fan 73 which sends hot air emitted from the heat source 72 in a predetermined direction and heats an internal space of the housing 71 with the hot air emitted from the heat source 72. The housing 71 has a box shape, and openings which allow upward and downward movement of the pipette tip 51 are formed in an upper wall 711 and a lower wall 712 of an outer wall surrounding the internal space. The pipette tip temperature controller 7 according to the present embodiment adopts insertion holes (an upper insertion hole 713 and a lower insertion hole 714), into which the pipette tip 51 is insertable, as the openings. In the present embodiment, the housing 71 is constructed using a housing body 715 with a bottom which is wide open at an upper portion and a top plate 716 which is arranged at a position which closes an upper opening of the housing body 715. The upper insertion hole 713 of the housing 71 is a circular hole formed in the top plate 716 while the lower insertion hole 714 of the housing 71 is a circular hole formed in a bottom portion of the housing body 715. The upper insertion hole 713 and the lower insertion hole 714 have a positional relationship so as to face in the vertical direction (an upward and downward movement direction of the pipette nozzle 52).

The pipette tip temperature controller 7 can heat the pipette tip 51 by exposing the pipette tip 51 inserted in the internal space of the housing 71 through the upper insertion hole 713 and the lower insertion hole 714 to hot air emitted from the heat source 72. Note that a sensor 717 (e.g., a thermistor) which can sense a temperature in the housing 71 and radiation fins 718 are arranged inside the housing 71 (see FIG. 3). Each radiation fin 718 with a mounted thermal fuse functions as a safety device. Although the fan 73 can also be arranged in the internal space of the housing 71, the fan 73 is fixed at a position outside the housing 71 which fronts on an opening 719 for fan formed in the outer wall (a side wall in the shown example) of the housing 71 and is set so as to be capable of sending hot air emitted from the heat source 72 in the predetermined direction by the fan 73 in the present embodiment. By minimizing parts arranged inside the housing 71, it is possible to achieve narrowing of the internal space of the housing 71 and efficiently perform the process of elevating the temperature of the internal space of the housing 71 to a predetermined target temperature set in advance with hot air and keeping the predetermined target temperature.

The pipette tip temperature controller 7 with a bracket 74 fixed to the housing 71 is made into a single unit. The pipette tip temperature controller 7 can be fixed to the sampler unit 5U by attaching the bracket 74 to the sampler unit 5U (see FIG. 2).

In the present embodiment, the pipette tip temperature controller 7 is arranged near the reaction container 3. More specifically, a clearance (a distance denoted by L in FIG. 4) between a lower end of the pipette tip temperature controller 7 (a bottom of the housing 71) and an upper surface of the reaction container 3 is set to, for example, about 5 mm, as shown in FIG. 4.

Figure 4:
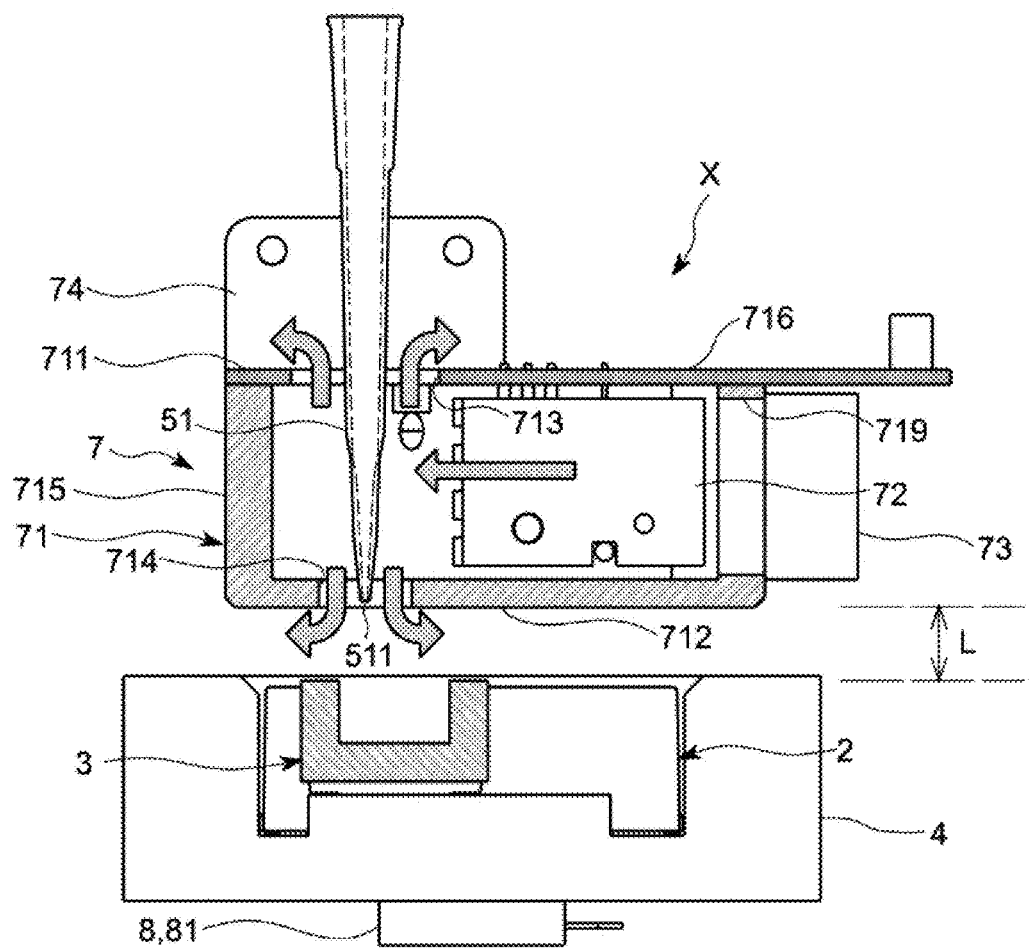
FIG. 4 is a view schematically showing the flow of hot air in the pipette tip temperature controller according to the embodiment.

With the adoption of the above-described layout, the reaction container 3 is exposed to hot air emitted from inside the housing 71 to the outside through the insertion holes (the lower insertion hole 714 in particular) of the housing 71, as indicated by arrows in FIG. 4. In FIG. 4, the flow of hot air generated from the heat source 72 of the pipette tip temperature controller 7 is schematically indicated by relatively thick arrows.

The controller 6 is composed of, for example, a publicly known computer or microcomputer which includes an arithmetic unit, a control device, a storage device, an input device, and an output device, and the like and controls operation of the portions of the analysis apparatus 1 including the liquid sending portion 5, the pipette tip temperature controller 7, and the reaction container temperature controller 8 in accordance with a predetermined program. The controller 6 includes a pipette tip temperature acquisition portion 61 which acquires the temperature in the housing 71 constituting the pipette tip temperature controller 7 from the sensor 717 and a reaction container temperature acquisition portion 62 which acquires the temperature of the reaction container 2 from a sensor (not shown). The present embodiment is configured such that the temperature of the reaction container 2 is indirectly acquired by acquiring the temperature of the stage 4.

The temperature control system X for the analysis apparatus 1 according to the present embodiment executes temperature control on the reaction container temperature controller 8 and the pipette tip temperature controller 7 with the controller 6 during execution of the process of detecting a substance to be detected by the analysis apparatus 1. The controller 6 performs temperature acquisition processing by the pipette tip temperature acquisition portion 61 and the reaction container temperature acquisition portion 62 at an appropriate time and performs temperature control on the basis of acquired temperatures so as to bring a pipette tip temperature control temperature from the pipette tip temperature controller 7 and a reaction container temperature control target temperature (stage temperature control target temperature) from the reaction container temperature controller 8 close to a pipette tip temperature control target temperature and a reaction container temperature control target temperature (stage temperature control target temperature) which are set in advance. The pipette tip temperature control temperature and the reaction container temperature control target temperature (stage temperature control target temperature) may be equal or different. For example, the reaction container temperature control target temperature (stage temperature control target temperature) can be set in accordance with a reaction temperature for the reagent, and the pipette tip temperature control target temperature can be set to a temperature which promises the effect of preventing the temperature from lowering at the time of aspirating and discharging liquid at a predetermined temperature by the pipette tip and can avoid adverse effects on the reagent and thermal deformation of the pipette tip itself.

As shown in FIG. 2 and FIG. 4, the temperature control system X according to the present embodiment is configured such that at least the distal end portion of the pipette tip 51 is held inside the housing 71 while the pipette nozzle 52 is located at the predetermined heating position. More specifically, the temperature control system X is set such that the distal end 511 of the pipette tip 51 is located in the lower insertion hole 714 of the housing 71 and a region from the distal end of a predetermined length of the pipette tip 51 is arranged inside the housing 71 while the pipette nozzle 52 is located at the heating position. In the present embodiment, an origin position for the pipette nozzle 52 is set at the heating position. Thus, the distal end portion of the pipette tip 51 can be heated inside the housing 71 by making the pipette nozzle 52 wait at the origin position.

In the present embodiment, while the pipette nozzle 52 is located at the heating position, a predetermined gap is formed between the distal end 511 of the pipette tip 51 and the lower insertion hole 714, and a predetermined gap is formed between the pipette tip 51 and the upper insertion hole 713. The present embodiment is set so as to prevent the pipette tip 51 from coming into contact with the housing 71. Hot air in the housing 71 spouts to outside the housing 71 through the gaps between the pipette tip 51 and the insertion holes (the upper insertion hole 713 and the lower insertion hole 714), and a temperature around the housing 71 can be kept nearly equal to the internal temperature of the housing 71 (see FIG. 4).

At the time of aspirating liquid in the test cartridge 2 into the pipette tip 51, the pipette nozzle 52 is lowered from the heating position by driving the nozzle driving portion 54 by the controller 6. Before this time, the stage 4 is moved to a position where the holding tank 21 holding a liquid as an object to be aspirated is immediately below the pipette nozzle 52 by driving the stage driving portion (not shown) by the controller 6. In a state where the pipette nozzle 52 is lowered from the heating position by a predetermined distance and is stopped, the pump 53 is driven by the controller 6 to aspirate the liquid as the object to be aspirated through the distal end of the pipette nozzle 52, i.e., the distal end 511 of the pipette tip 51. Since the stage 4 is heated here by the heater 81 for stage temperature control that is the reaction container temperature controller 8, the liquid as the object to be aspirated held in the test cartridge 2 on the stage 4 is also heated.

Liquid aspirated into the pipette tip 51 is held by the distal end portion of the pipette tip 51. In this state, the nozzle driving portion 54 is driven by the controller 6 to return the pipette nozzle 52 to the heating position. During a period from when the pipette nozzle 52 is lowered from the heating position to when the pipette nozzle 52 is returned to the heating position, the distal end portion of the pipette tip 51 is out of the housing 71 of the pipette tip temperature controller 7, and the temperature of the distal end portion is affected by an external temperature around the housing 71 and decreases.

However, the temperature control system X according to the present embodiment can reduce the degree, to which the temperature of the distal end portion of the pipette tip 51 decreases during the period from when the pipette nozzle 52 is lowered from the heating position to when the pipette nozzle 52 is returned to the heating position by keeping the temperature around the housing 71 nearly equal to the internal temperature of the housing 71 with hot air in the housing 71 spouting to outside the housing 71 through the gaps between the pipette tip 51 and the insertion holes (the upper insertion hole 713 and the lower insertion hole 714).

When the pipette nozzle 52 is returned to the heating position, the distal end portion of the pipette tip 51 is arranged in the housing 71 and is heated by the pipette tip temperature controller 7, and the liquid in the pipette tip 51 is also heated. Particularly if the surface (liquid surface) of the liquid retained in the pipette tip 51 is lower than the upper wall 711 (the upper insertion hole 713) of the housing 71 in the pipette tip temperature controller 7 while the pipette nozzle 52 is returned to the heating position, the whole of the liquid in the pipette tip 51 is present in a heated space in the housing 71, and the liquid can be efficiently heated.

Figure 5:
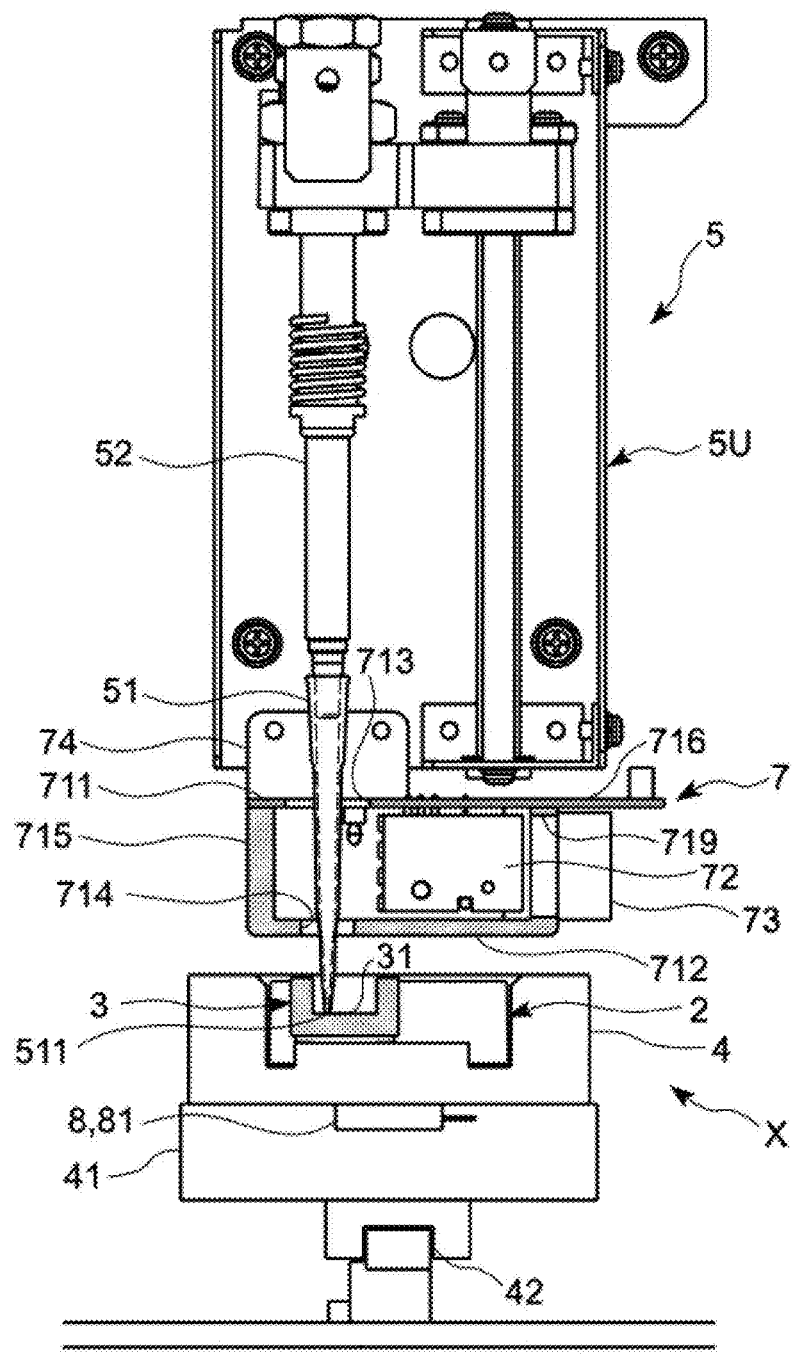
FIG. 5 is a view corresponding to FIG. 2 of a state where a pipette nozzle according to the embodiment is lowered from a reference position by a predetermined distance.

In the present embodiment, simultaneously with or after the return of the pipette nozzle 52 to the heating position, the stage driving portion is driven by the controller 6 to move the stage 4 to a discharge destination for the liquid retained in the pipette tip 51 or, more specifically, a position where the tank 21 of the test cartridge 2 or the holding portion 31 of the reaction container 3 is immediately below the pipette nozzle 52. As shown in FIG. 5, in a state where the pipette nozzle 52 is lowered from the heating position by the predetermined distance and is stopped, the pump 53 is driven by the controller 6 to discharge the liquid in the pipette tip 51 from the distal end of the pipette nozzle 52, i.e., the distal end 511 of the pipette tip 51 toward the discharge destination. The temperature of the liquid at the time of the discharge (a discharged liquid temperature) is a temperature close to the set target temperature for the pipette tip temperature controller 7. Satisfaction of all or one of the condition that the pipette tip 51 and the liquid be heated in the housing 71 of the pipette tip temperature controller 7 until immediately before the liquid discharge processing, the condition that the liquid in the pipette tip 51 be heated by residual heat of the pipette tip 51 even in a state where the distal end portion of the pipette tip 51 is out of the housing 71, and the condition that the temperature around the housing 71 be kept at a temperature close to that inside the housing 71 with hot air spouting to outside the housing 71 through the gaps between the pipette tip 51 and the insertion holes (the upper insertion hole 713 and the lower insertion hole 714) means that the discharged liquid temperature is controlled to close to a targeted temperature suitable for reaction (a reaction target temperature).

Since the stage 4 is heated by the heater 81 for stage temperature control that is the reaction container temperature controller 8 in the temperature control system X according to the present embodiment, each tank 21 of the test cartridge 2 and the holding portion 31 of the reaction container 3 are also heated on the stage 4.

Thus, if liquid in the pipette tip 51 temperature-controlled by the pipette tip temperature controller 7 is discharged toward the holding portion 31 of the reaction container 3 temperature-controlled by the reaction container temperature controller 8 (the heater 81 for stage temperature control), even when a working environmental temperature for the analysis apparatus 1 is 10 to 30° C., a reaction in the holding portion 31 of the reaction container 3 can be produced without being affected by the working environmental temperature, and a stable reaction result can be obtained.

As described above, the temperature control system X according to the present embodiment is capable of heating at least the distal end portion of the pipette tip to close to a targeted temperature by heating, in a concentrated (intensive) manner, at least the distal end portion of the pipette tip 51 with hot air emitted from the heat source 72 while the pipette nozzle 52 is located at the heating position. More specifically, since at least the distal end portion of the pipette tip 51 is held inside the housing 71 of the pipette tip temperature controller 7 while the pipette nozzle 52 is located at the heating position, the pipette tip 51 can be heated to close to the targeted temperature with hot air in the housing 71. The temperature control system X according to the present embodiment is configured such that at least the distal end portion of the pipette tip 51 is located outside the housing 71 through the insertion hole (the lower insertion hole 714) if the pipette nozzle 52 is lowered straight down from the heating position. For this reason, if a liquid, such as the reagent, is aspirated through the distal end 511 of the pipette tip 51 while the pipette nozzle 52 is lowered from the heating position, the liquid, such as a reagent, aspirated into the heated pipette tip 51 is also heated. Additionally, the pipette tip 51 can be heated again by locating the pipette nozzle 52 at the heating position while liquid is aspirated into the pipette tip 51 and retained, and the liquid in the pipette tip 51 is also heated.

The above-described temperature control system X according to the present embodiment is configured such that the distal end of the pipette tip 51 can arrive at the reaction container 3 by lowering the pipette nozzle 52 from the heating position and can achieve stabilization of reaction efficiency in the reaction container 3 by discharging a liquid, such as the reagent, heated in the pipette tip 51 from the distal end 511 of the pipette tip 51 located outside the housing 71 through the insertion hole (the lower insertion hole 714) to the reaction container 3 heated by the reaction container temperature controller 8. That is, the temperature control system X according to the present embodiment is capable of keeping both a liquid, such as the reagent or the analyte, aspirated or discharged by the pipette tip 51 and the reaction container 3 at temperatures close to a targeted reaction temperature, capable of causing the reagent or the like to react with the analyte at the target reaction temperature, and capable of enhancing the accuracy of a detection result from the analysis apparatus 1 and stabilizing the reaction efficiency.

Thus, even if the number of times liquid aspiration and discharge processing or agitation processing through the distal end 511 of the pipette tip 51 is performed is large when one pipette tip 51 is repeatedly used for test on one test cartridge 2 having the reaction container 3 mounted thereon, the temperature control system X for the analysis apparatus 1 according to the present embodiment returns the pipette nozzle 52 to the heating position each time the liquid aspiration and discharge processing or agitation processing ends. This allows heating of the pipette tip 51 and liquid in the pipette tip 51 and avoidance of a situation where the liquid in the pipette tip 51 is subjected to the liquid aspiration and discharge processing or agitation processing in a state of being affected by the working environmental temperature and being decreased.

Additionally, the temperature control system X according to the present embodiment does not use a dedicated pipette nozzle provided with a heating function and can use the already-known pipette nozzle 52 heavily used in analysis sites without change, and is also excellent in general versatility and utility.

In addition, since the heating position is set at the origin position for the pipette nozzle 52, the temperature control system X according to the present embodiment is configured such that at least the distal end portion of the pipette tip 51 is held inside the housing 71 of the pipette tip temperature controller 7 while the pipette nozzle 52 is located at the origin position. The configuration can achieve simplification of operation control of the pipette nozzle 52 required to heat the pipette tip 51 with the pipette tip temperature controller 7, as compared with a configuration where a position of the pipette nozzle 52, at which the distal end portion of the pipette tip 51 is held inside the housing 71, is set at a dedicated position different from the origin position.

In the temperature control system X for the analysis apparatus 1 according to the present embodiment, since the reaction container 3 is arranged near the pipette tip temperature controller 7, an atmospheric temperature around the reaction container 3 can be kept nearly equal to the temperature in the housing 71 with hot air spouting to outside the housing 71 through the insertion holes 713 and 714 of the housing 71. As a result, even in a state where the pipette nozzle 52 is lowered from the heating position, the pipette tip 51 is arranged under an atmosphere heated with hot air and is insusceptible to the working environmental temperature. Additionally, since the insertion holes 713 and 714, into which the pipette tip 51 is insertable (insertable/removable), are used as openings which are formed in the housing 71 so as to satisfy a condition allowing upward and downward movement of the pipette tip 51 in the present embodiment, heating efficiency in the housing 71 is high, and energy consumption for heating can be reduced.

As described above, application of the temperature control system X according to the present embodiment to an analysis apparatus makes it possible to equalize respective reaction temperatures for analyses at the time of analysis of a sample after reaction between a reagent and the sample and enhance analysis accuracy.

Note that the present invention is not limited to the above-described embodiment. For example, in a temperature control system including a pipette tip temperature controller which heats an internal space of a housing capable of holding at least a distal end portion of a pipette tip with hot air emitted from a heat source, hot air adjustment means for uniformly spreading hot air emitted from the heat source to around the pipette tip can be provided in the housing in order to inhibit unevenness in temperature in the internal space of the housing, more particularly around the pipette tip.

Figure 6:
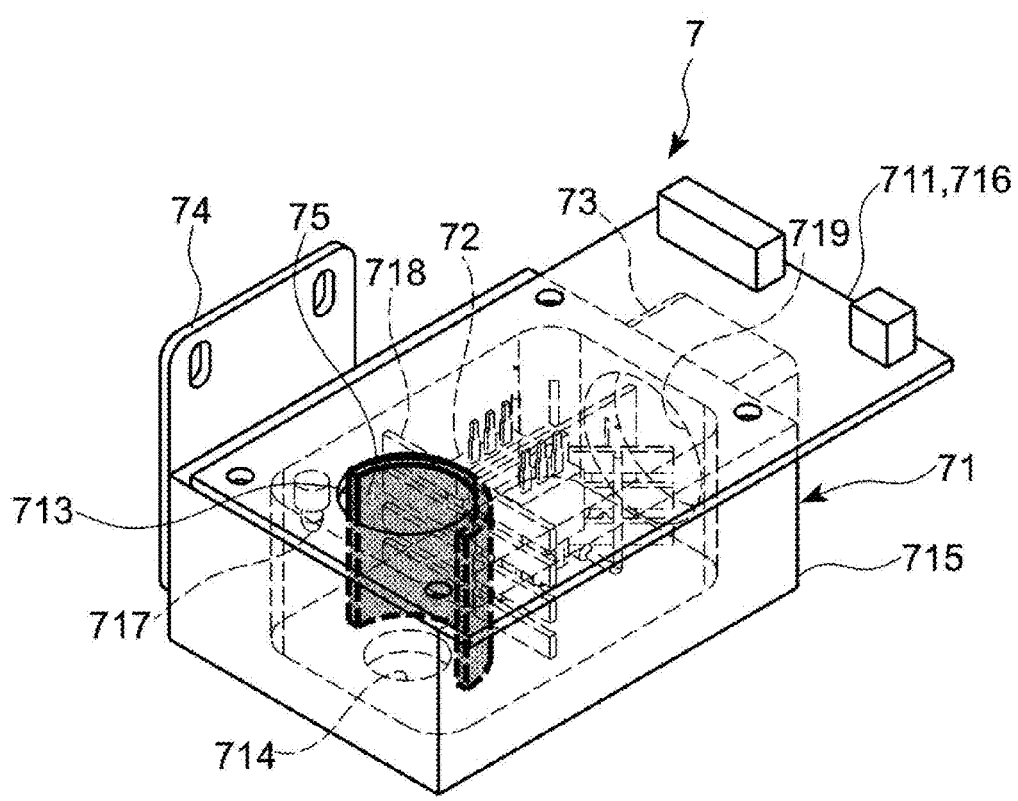
FIG. 6 is a view corresponding to FIG. 3 of a modification of the pipette tip temperature controller according to the embodiment.
Figure 7:
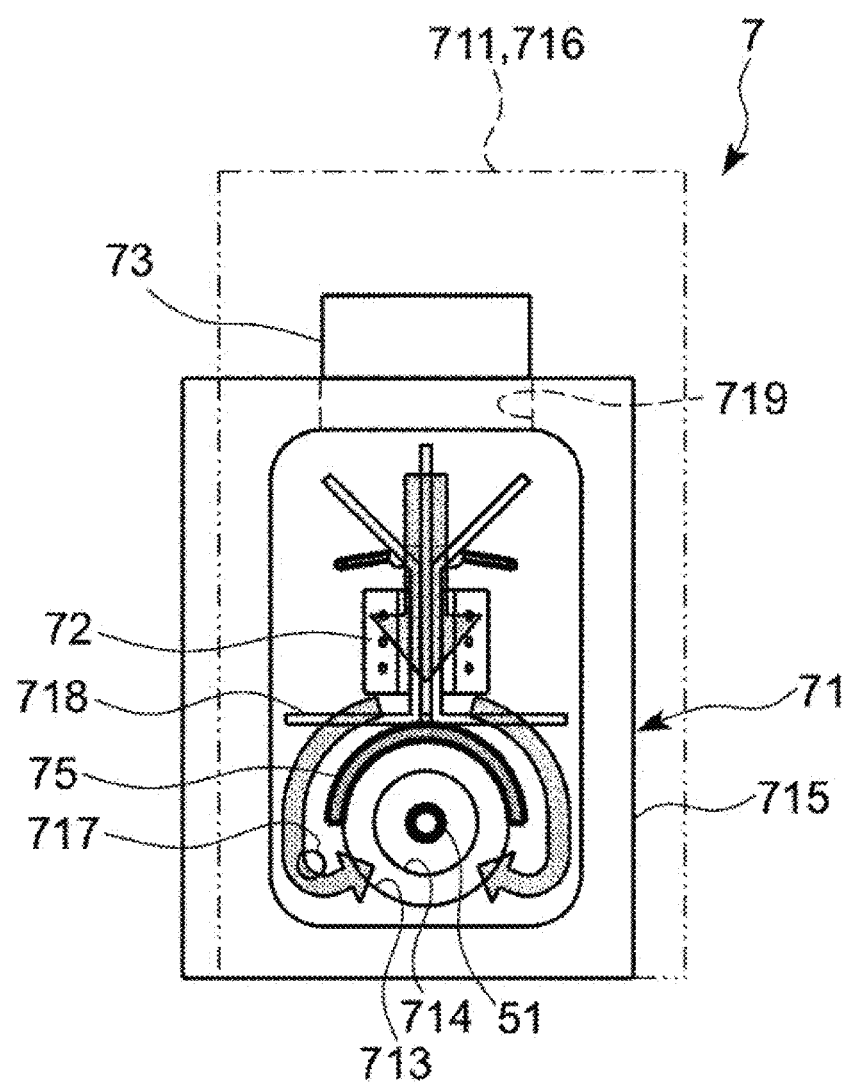
FIG. 7 is a view schematically showing the flow of hot air in a pipette tip temperature controller that is the modification.

In particular, in the case of the pipette tip temperature controller 7, in which a wind shielding plate 75 which hot air emitted from the heat source 72 and indicated by arrows hits before hitting the pipette tip 51, is provided inside the housing 71 such that hot air goes around the wind shielding plate 75 and arrives at the pipette tip 51, as shown in FIG. 6 and FIG. 7, the flow of hot air does not concentrate on a line toward the pipette tip 51, as compared with a pipette tip temperature controller configured such that hot air emitted from the heat source 72 directly hits the pipette tip 51. This allows effective inhibition of development of unevenness in temperature in an internal space of the housing 71, more particularly around the pipette tip 51. FIG. 6 is a view showing the pipette tip temperature controller 7 according to the present modification in a form corresponding to FIG. 3. FIG. 7 is a plan view of the pipette tip temperature controller 7 in FIG. 6. In FIG. 6 and FIG. 7, the wind shielding plate 72 is indicated by relatively thick lines and has a predetermined pattern. In FIG. 7, the pipette tip 51 is schematically shown, and the upper wall 711 (the top plate 716) is indicated by a phantom line (chain double-dashed line).

The pipette tip temperature controller 7 shown in FIG. 6 and FIG. 7 is configured such that the wind shielding plate 75 is arranged on an imaginary line connecting the heat source 72 and the centers of the openings 713 and 714 and such that hot air arriving at the pipette tip 51 located at central portions of the openings 713 and 714 is hot air which flows around the wind shielding plate 75. Preferred examples of the wind shielding plate 75 that can be named include a plate material which has an inner diameter identical or almost identical to an opening size of the opening 714 and the shape of a circular arc (the shape of the arc of a semicircle) in plan view, as shown in FIG. 6 and FIG. 7. The wind shielding plate 75 preferably has a height dimension slightly smaller than a height dimension inside the housing 71. The wind shielding plate 75 is arranged around the pipette tip 51 in a posture to shield a region of the pipette tip 51 which fronts on the heat source 72 from the heat source 72 side.

With the above-described hot air adjustment means using the wind shielding plate 75, hot air heading linearly from the heat source 72 toward the pipette tip 51 hits the wind shielding plate 75 before hitting the pipette tip 51, is guided by the wind shielding plate 75, and goes around the wind shielding plate 75. This allows uniform spread of hot air to around the pipette tip 51 and reduction of unevenness in temperature in the internal space of the housing 71, more particularly around the pipette tip. With the adoption of this configuration, an individual difference in temperature due to a positional relationship between the radiation plate 718 (radiation fins) and a sensor (the thermistor 717 for temperature control) is unlikely to occur, and stabilization of temperature control by the pipette tip temperature controller 7 can be achieved, as compared with a configuration where hot air emitted from the heat source 72 heads linearly toward the pipette tip 51 and directly hits the pipette tip 51. Note that the sensor 717 is preferably arranged at a position where the temperature of hot air going around the wind shielding plate 75 and heading toward the pipette tip 51 can be measured of the flow of hot air from the housing 71 to the wind shielding plate 75 to the pipette tip 51, i.e., not between the housing 71 and the wind shielding plate 75 but between the wind shielding plate 75 and the pipette tip 51 (see FIG. 7).

Any wind shielding plate may be used as long as the wind shielding plate satisfies the condition that hot air heading from a heat source toward a pipette tip hit the wind shielding plate before hitting the pipette tip and the condition that the hot air after the hit be uniformly distributed (dispersed) around the pipette tip. The shape and the number of wind shielding plates are not particularly limited and can be appropriately changed and selected.

Hot air adjustment means can be constructed using a fan which directs the flow of hot air emitted from a heat source such that the flow of the hot air spreads uniformly around a pipette tip. A pipette tip temperature controller having heat sources arranged at a plurality of sites such that hot air hits a pipette tip from many directions regardless of the presence or absence of hot air adjustment means may be used. Note that a single heat source is preferably used in terms of reduction in energy consumption for heating and structure simplification.

An infrared heater, a tungsten lamp, a planar heater, a nichrome wire sheath heater, or the like can be used as a heat source of a pipette tip temperature controller.

Any reaction container temperature controller may be used as long as the reaction container temperature controller can temperature-control at least a reaction container. A reaction container temperature controller without a function of heating a reagent or the like held in a test cartridge holding the reagent or the like may be used. A reaction container temperature controller which heats only an installation area for a reaction container if an installation area for a test cartridge and the installation area for the reaction container are clearly distinguishable can be named as an example.

One which is configured such that a height position of a housing is adjustable may be used as a pipette tip temperature controller. In this case, the height position of the housing can be adjusted in accordance with a height position of a pipette tip with a pipette nozzle located at a heating position or a height position of a reaction container or a test cartridge.

The size of an internal space of a housing may be changed in view of the size of a pipette tip and temperature control efficiency.

Although an aspect, in which a pipette nozzle is configured to be capable of movement (upward and downward movement) only in a height direction while a stage is configured to be capable of movement in a horizontal direction, is illustrated in the above-described embodiment, a pipette nozzle can also be configured to be capable of movement from a heating position also in a horizontal direction with respect to an immovable stage. In this case, if a pipette tip temperature controller is set capable of horizontal movement from the heating position in synchronism with the pipette nozzle, it is possible to avoid a situation where the pipette tip comes into contact with the pipette tip temperature controller at the time of horizontal movement of the pipette nozzle. Even if this modification is adopted, the condition that at least a distal end portion of a pipette tip be held inside a housing while a pipette nozzle is located at a heating position and at least the distal end portion of the pipette tip be located outside the housing through an insertion hole if the pipette nozzle is lowered from the heating position is satisfied. The modification is configured such that at least the distal end portion of the pipette tip is held inside the housing while the pipette nozzle is located at the heating position and while the pipette nozzle is horizontally moved from the heating position and such that at least the distal end portion of the pipette tip is located outside the housing through the insertion hole if the pipette nozzle is lowered from the heating position and if the pipette nozzle is lowered from a position after the pipette nozzle is horizontally moved from the heating position.

Modifications of a pipette tip temperature controller that can be named include an aspect using a housing composed of a single part or an aspect configured such that a plurality of pipette tips can be heated simultaneously or in a staggered manner.

Any pipette tip temperature controller that heats, in a concentrated (intensive) manner, at least a distal end portion of a pipette tip of a pipette nozzle located at a predetermined heating position as a pipette tip temperature controller according to the present invention can be used. A pipette tip temperature controller as shown in each of FIG. 8 and subsequent figures can be used.

Figure 8:
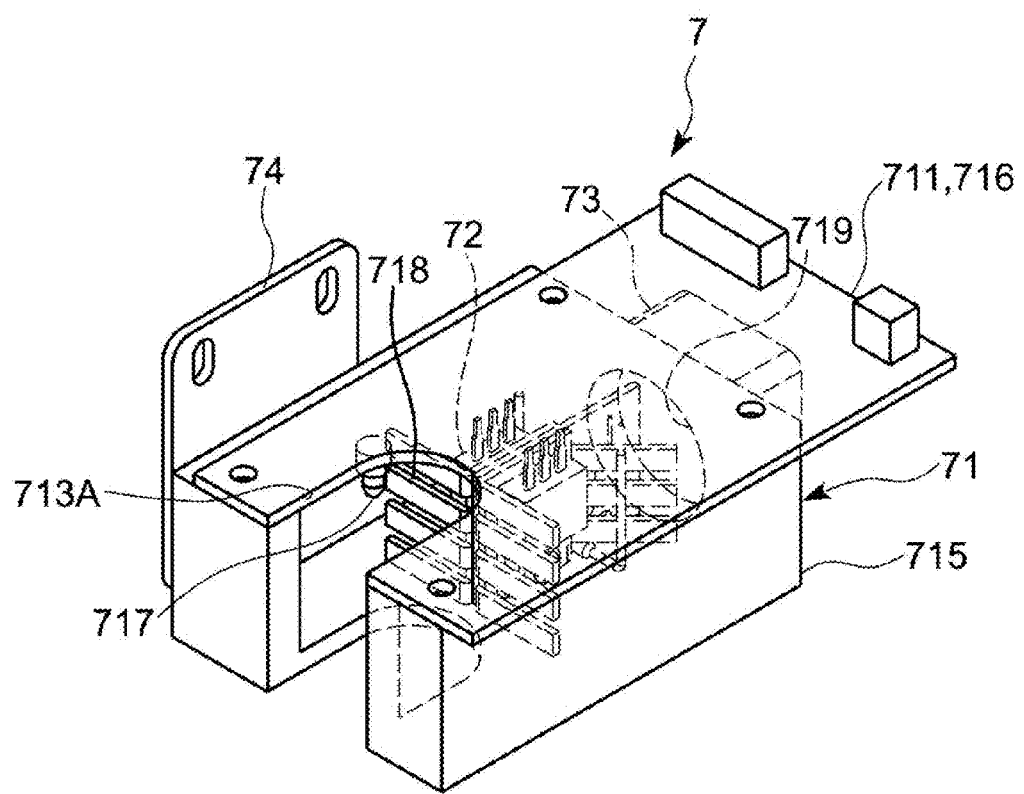
FIG. 8 is a view corresponding to FIG. 3 of an example of a pipette tip temperature controller according to the present invention.
Figure 9:
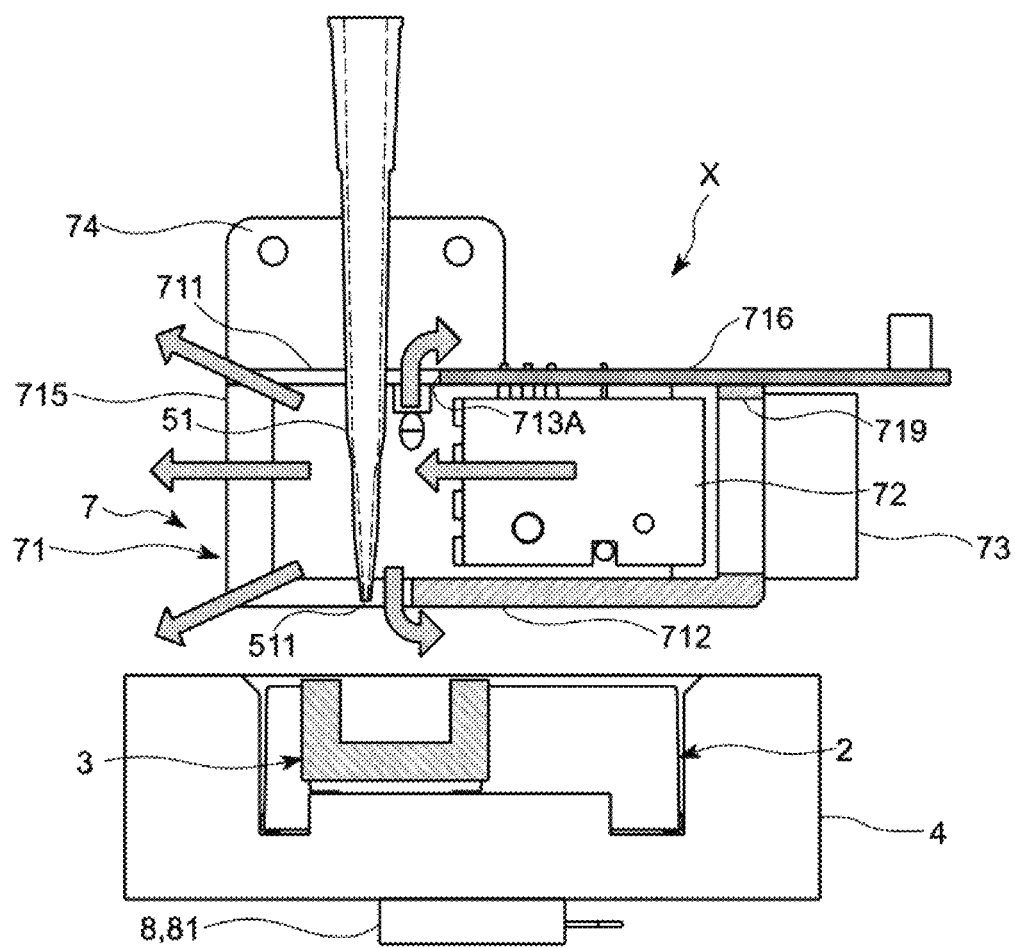
FIG. 9 is a view corresponding to FIG. 4 of the pipette tip temperature controller in FIG. 7.

For example, one which is open not only in a height direction but also in at least one direction of a front direction, a back direction, and a lateral direction can be used as an opening which is formed in a housing and allows upward and downward movement of a pipette tip. In the pipette tip temperature controller 7 shown in FIG. 8 and FIG. 9, an opening 713A which is open in a height direction and in a lateral direction is formed in the housing 71. In FIG. 8 and FIG. 9, portions and parts corresponding to those of the above-described pipette tip temperature controller 7 are denoted by same reference numerals.

Figure 10:
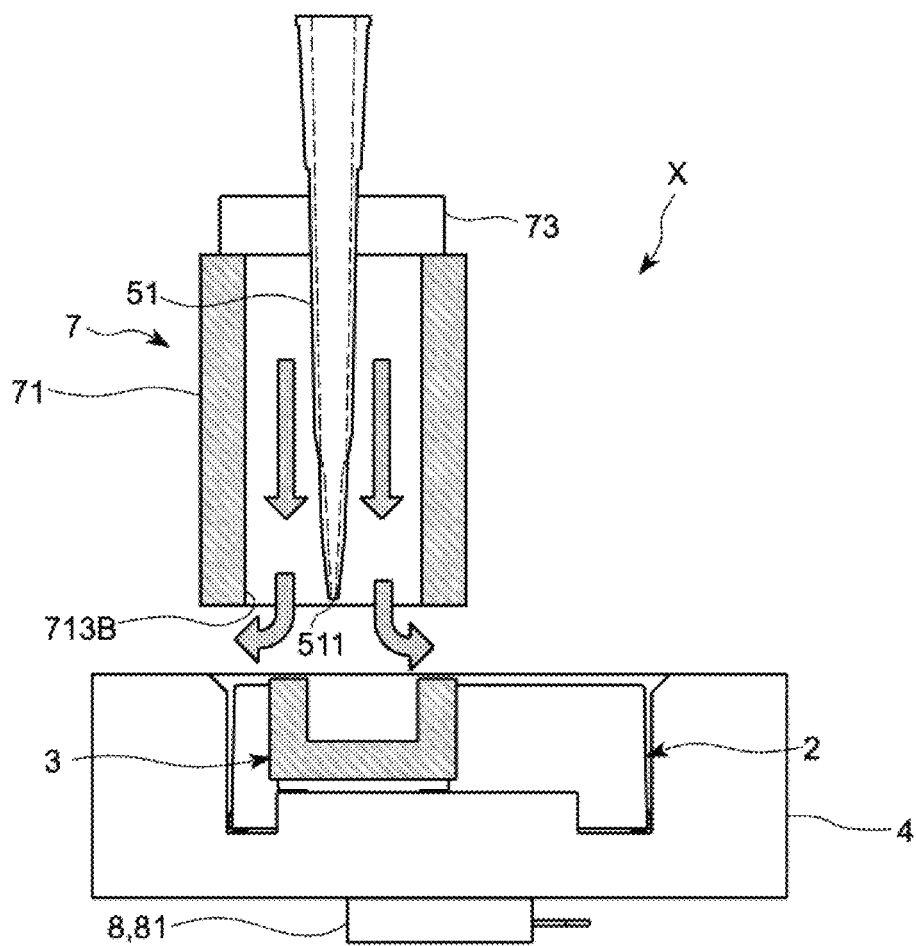
FIG. 10 is a view corresponding to FIG. 4 of an example of the pipette tip temperature controller according to the present invention.

As a pipette tip temperature controller, one including a cylindrical housing, an internal space of which is open in a height direction, may be used. An example of the cylindrical housing is shown in FIG. 10. The pipette tip temperature controller 7 shown in FIG. 10 holds at least a distal end portion of the pipette tip 51 of a pipette nozzle located at a heating position in the cylindrical housing 71 and can heat, in a concentrated manner, at least the distal end portion of the pipette tip 51 with hot air emitted from a heat source (not shown). In the configuration shown in FIG. 10, the reaction container 3 arranged near the pipette tip temperature controller 7 is exposed to hot air emitted from inside the housing 71 to the outside through an opening 713B which is open in a height direction of the housing 71.

As a pipette tip temperature controller, one which includes a housing arranged near at least a distal end portion of a pipette tip of a pipette nozzle located at a predetermined heating position and heats, in a concentrated manner, at least the distal end portion of the pipette tip with hot air emitted from inside the housing to outside the housing and indicated by arrows may be used.

Figure 11:
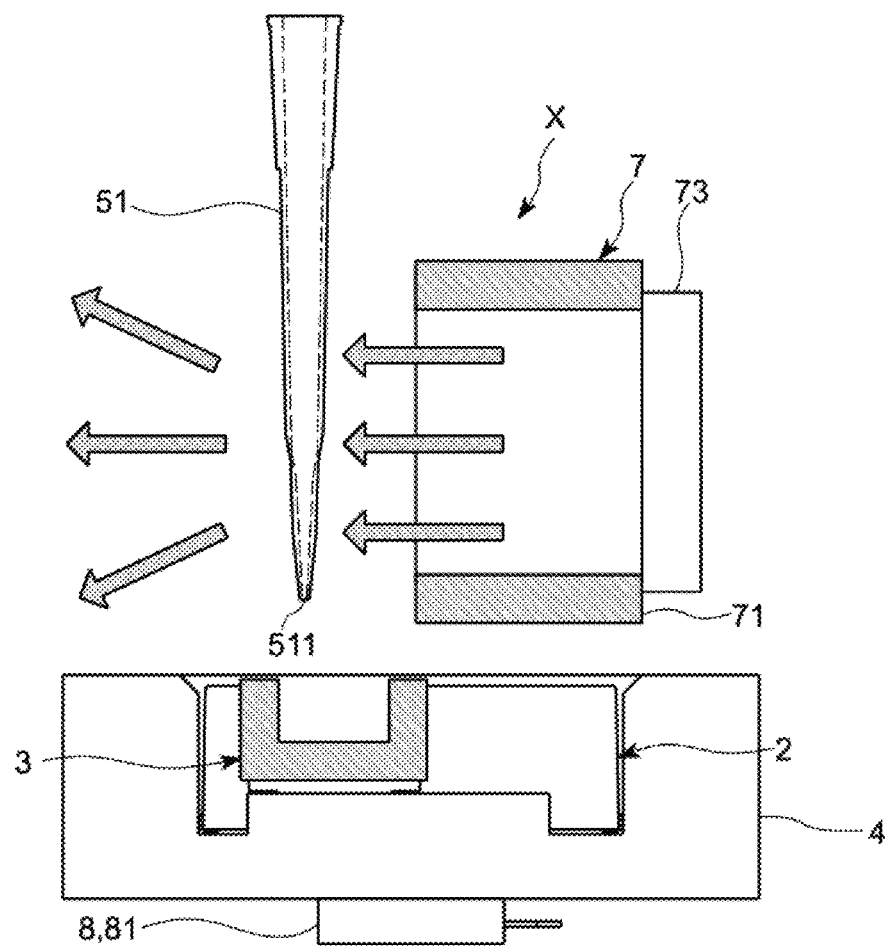
FIG. 11 is a view corresponding to FIG. 4 of an example of the pipette tip temperature controller according to the present invention.

The pipette tip temperature controller 7 shown in FIG. 11 includes the housing 71 arranged near at least a distal end portion of the pipette tip 51 of a pipette nozzle located at a predetermined heating position or, more specifically, arranged laterally to the distal end portion of the pipette tip 51 and heats, with surgical precision, at least the distal end portion of the pipette tip 51 with hot air emitted from a heat source (not shown) provided in the housing 71 and indicated by arrows.

Figure 12:
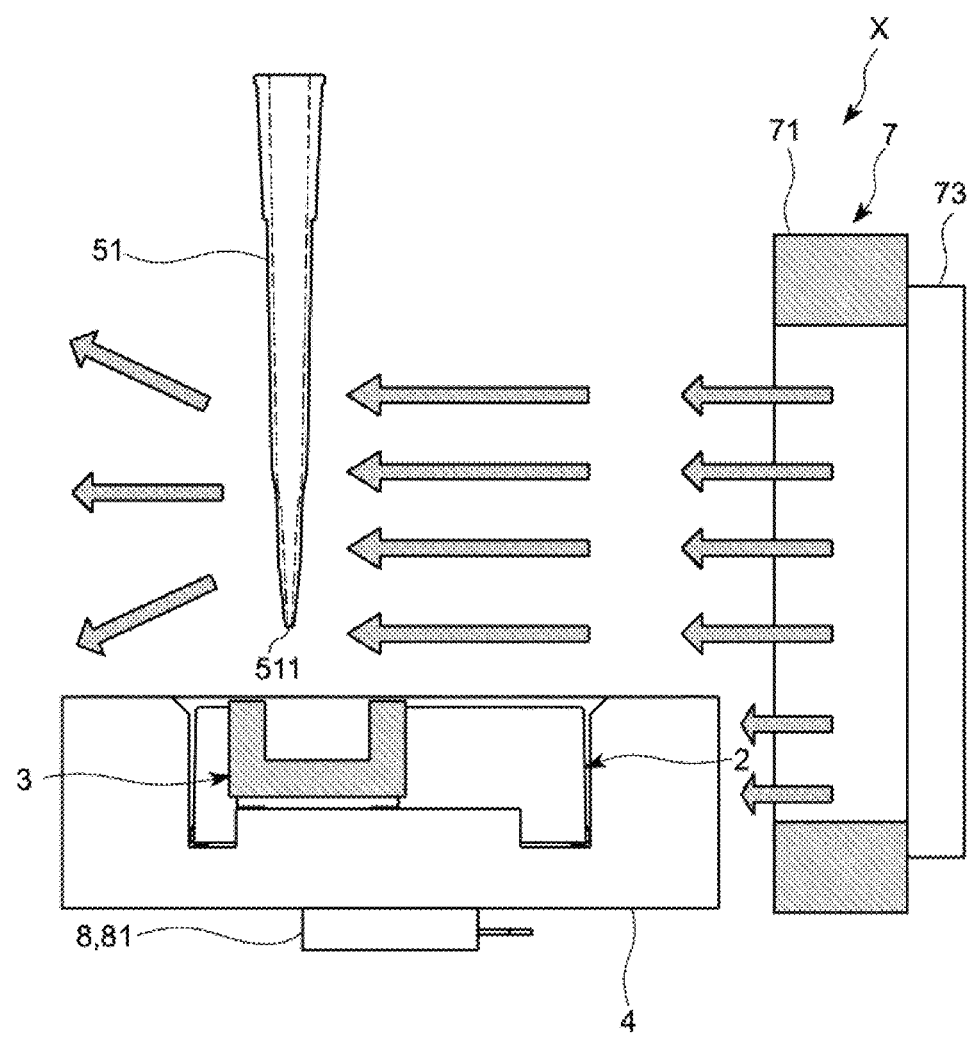
FIG. 12 is a view corresponding to FIG. 4 of an example of the pipette tip temperature controller according to the present invention.

The pipette tip temperature controller 7 shown in FIG. 12 includes the housing 71 arranged laterally to at least a distal end portion of the pipette tip 51 of a pipette nozzle located at a predetermined heating position and laterally to the reaction container 3 (the stage 4 in the shown example) and heats, in a concentrated manner, at least the distal end portion of the pipette tip 51 and the reaction container 3 (the stage 4 in the shown example) with hot air emitted from a heat source (not shown) provided in the housing 71 and indicated by arrows. Note that the pipette tip temperature controller 7 shown in FIG. 12 includes the housing 71 larger in height dimension than the housing 71 of the pipette tip temperature controller 7 shown in FIG. 9.

Figure 13:
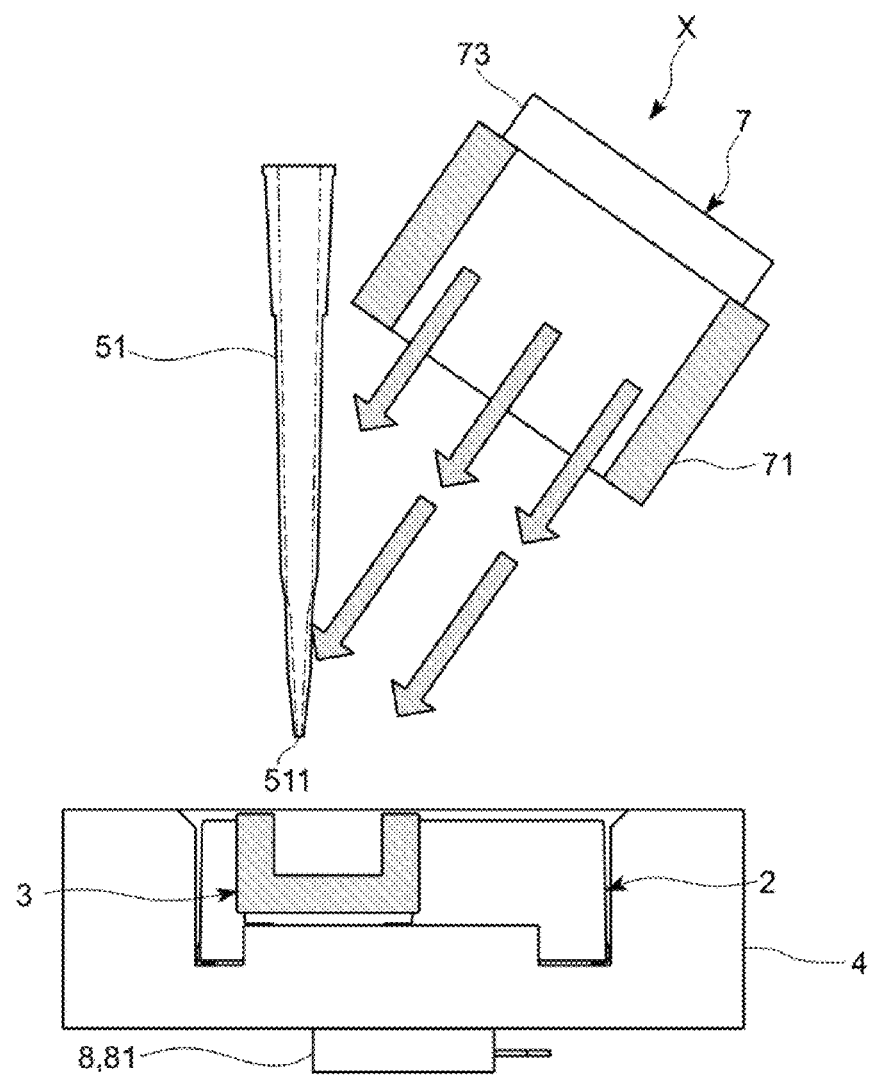
FIG. 13 is a view corresponding to FIG. 4 of an example of the pipette tip temperature controller according to the present invention.

The pipette tip temperature controller 7 shown in FIG. 13 includes the housing 71 that is arranged obliquely above at least a distal end portion of the pipette tip 51 of a pipette nozzle located at a predetermined heating position and heats, in a concentrated manner, the distal end portion of the pipette tip 51 by blowing hot air emitted from a heat source (not shown) provided in the housing 71 and indicated by arrows from obliquely above at least the distal end portion of the pipette tip 51.

Although not shown, as a pipette tip temperature controller, one which includes a housing arranged obliquely below at least a distal end portion of a pipette tip of a pipette nozzle located at a predetermined heating position and heats at least the distal end portion of the pipette tip by blowing hot air emitted from a heat source (not shown) provided in the housing from obliquely below may be used.

Any of the above-described pipette tip temperature controller has a configuration where the flow of hot air emitted from the heat source provided in the housing is set by a fan (reference numeral 73 in the figure) fixed on an outer surface of the housing so as to head toward the distal end portion of the pipette tip. The present invention can also adopt a pipette tip temperature controller having a fan provided in a housing. If hot air emitted from a heat source provided in a housing heads toward a distal end portion of a pipette tip without dependence on a fan, a fan can be omitted.

Additionally, as a pipette tip temperature controller, one which does not include a housing and is configured such that hot air emitted from a heat source hits at least a distal end portion of a pipette tip may be used. In this case, hot air may be blown to at least the distal end portion of the pipette tip by a fan or a configuration where at least the distal end portion of the pipette tip is heated by exposing at least the distal end portion of the pipette tip to under an atmosphere of hot air may be adopted.

A pipette tip temperature controller may be one which heats, in a concentrated manner, a distal end portion of a pipette nozzle with hot air emitted from a heat source from a plurality of directions (e.g., a horizontal direction and an oblique direction). As described above, the number of heat sources for the pipette tip temperature controller may be one or more.

In the present invention, a predetermined heating position for a pipette nozzle can also be set at an arbitrary position other than an origin position for the pipette nozzle.

A reaction container according to the present invention may be one which has a liquid flow path or be a microplate in which a plurality of wells are arranged in a matrix on a common base plate. In each of the cases, liquid aspiration and discharge processing or agitation processing through a pipette tip is performed in the liquid flow path or in a well.

A temperature control system according to the present invention can also be applied to an appropriate apparatus other than an analysis apparatus, such as a dispensation apparatus.

A specific configuration of each portion is also not limited to the above embodiment, and various modification can be made without departing from the spirit of the present invention.

INDUSTRIAL APPLICABILITY

The present invention is available for a temperature control system.

REFERENCE SIGNS LIST 1 analysis apparatus
3 reaction container
51 pipette tip
52 pipette nozzle
7 pipette tip temperature controller
71 housing
713, 714 opening (upper insertion hole, lower insertion hole)
713A, 713B opening
72 heat source
8 reaction container temperature controller
X temperature control system

The invention claimed is:

1. An analyzer system having a temperature control system applied to an analyzer apparatus for analyzing a sample using a pipette nozzle and a reaction container, comprising:
   the pipette nozzle;
   the reaction container for reaction of a reagent with the sample;
   the analyzer apparatus configured to detect a substance in the sample after reaction with the reagent in the reaction container;
   a pipette tip temperature controller having a heat source configured to emit a hot air which heats a pipette tip which has a proximal end fitted on the pipette nozzle and aspirates or discharges liquid; and
   a reaction container heater that heats the reaction container,
   the pipette tip temperature controller heating at least a distal end of the pipette tip of the pipette nozzle located at a predetermined heating position with the hot air emitted from the heat source,
   the pipette tip temperature controller comprising a housing configured to hold at least a distal end of the pipette tip, in a part of the housing, an opening that allows upward and downward movement of the pipette tip being formed,
   the opening being configured such that the distal end of the pipette tip is configured to arrive at the reaction container when the pipette nozzle is lowered from the heating position, and
   wherein the pipette tip temperature controller heats an internal space of the housing, and the pipette tip temperature controller is configured such that at least the distal end of the pipette tip is held inside the housing while the pipette nozzle is located at the predetermined heating position and such that at least the distal end of the pipette tip is located outside the housing through the opening when the pipette nozzle is lowered from the heating position.

2. The analyzer system according to claim 1, wherein the opening is an insertion hole, into which the pipette tip is insertable.

3. The analyzer system according to claim 1, wherein the opening is configured such that the hot air from the heat source is emitted from the opening to heat the reaction container.

4. The analyzer system according to claim 1, wherein the opening is configured such that the hot air from the heat source is emitted from the opening to heat the pipette nozzle when the pipette nozzle is lowered from the heating position.

* * * * *